(Model.)  2 Sheets—Sheet 1.
C. GAGE.
DRILL CHUCK.
No. 247,035.  Patented Sept. 13, 1881.
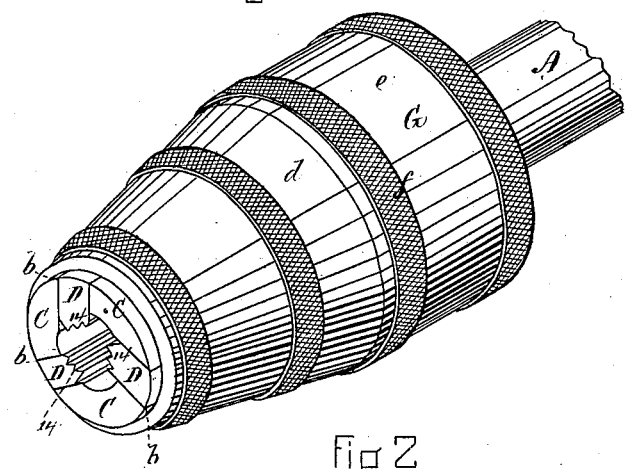
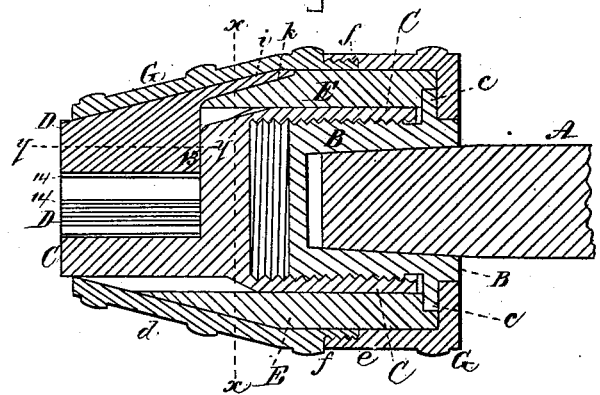
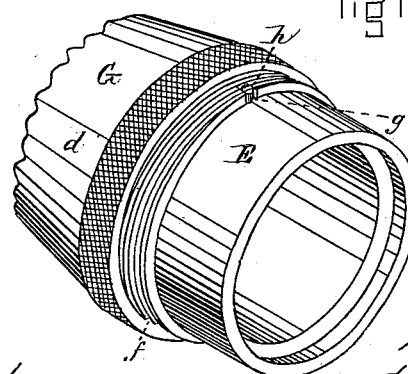
Witnesses
W. J. Cambridge
Chas. E. Griffin
Inventor
Charles Gage
per R. E. Fetschemacher
Atty.

(Model.) 2 Sheets—Sheet 2.
C. GAGE.
DRILL CHUCK.
No. 247,035. Patented Sept. 13, 1881.
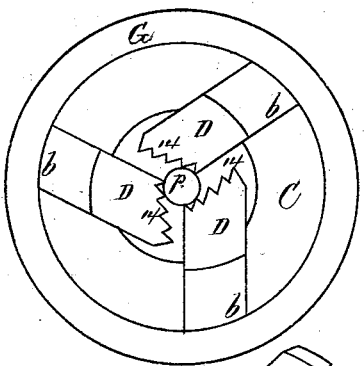
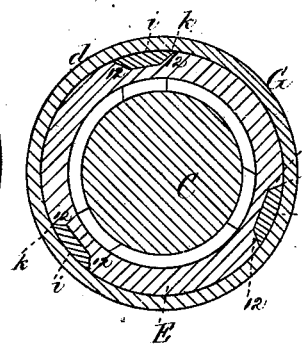
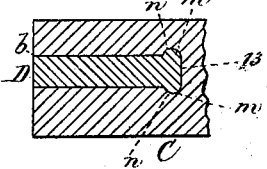
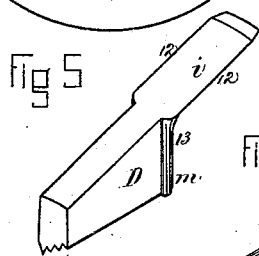
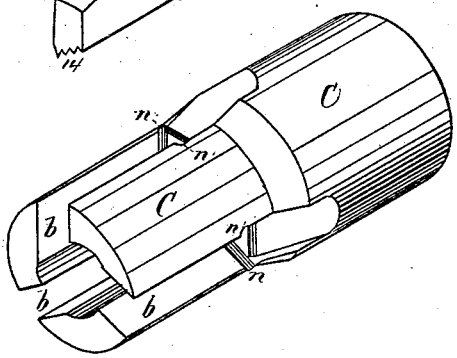
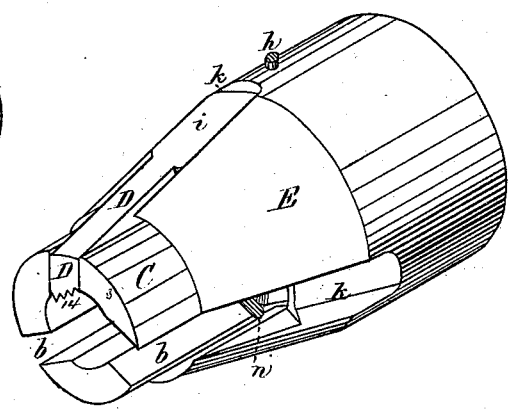
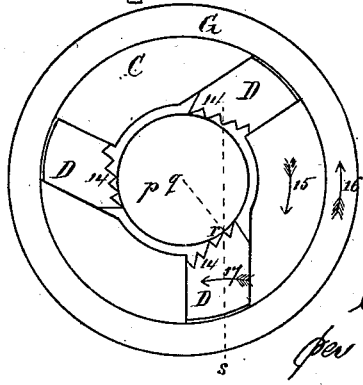
WITNESSES
W. J. Cambridge
Chas. E. Griffin
INVENTOR
Charles Gage
per P. E. Teschemacher
Atty

UNITED STATES PATENT OFFICE.

CHARLES GAGE, OF BOSTON, ASSIGNOR TO HIMSELF AND LEWIS B. RUSSELL, OF LYNN, MASSACHUSETTS.

DRILL-CHUCK.

SPECIFICATION forming part of Letters Patent No. 247,035, dated September 13, 1881.

Application filed March 11, 1881. (Model.)

*To all whom it may concern:*

Be it known that I, CHARLES GAGE, a citizen of the United States, residing at Boston, in the county of Suffolk and State of Massachusetts, have invented certain Improvements in Drill-Chucks, of which the following is a full, clear, and exact description, reference being had to the accompanying drawings, making part of this specification, in which—

Figure 1 is a perspective view of a drill-chuck constructed in accordance with my invention. Fig. 2 is a longitudinal vertical section through the same. Fig. 3 is a transverse vertical section on the line $x\ x$ of Fig. 2. Fig. 4 is a view of the holder or mandrel which contains the jaws. Fig. 5 is a view of one of the jaws detached. Fig. 6 is a view of the shell or casing with the holder inserted therein. Fig. 7 is an enlarged elevation of the front end of the chuck, with a large drill secured therein. Fig. 8 is a similar elevation, with a small drill secured between the jaws. Fig. 9 is a sectional detail on the line $y\ y$ of Fig. 2. Fig. 10 is a detail in perspective.

Drill-chucks as heretofore constructed have been more or less objectionable on account of their inability to hold a round drill-spindle without liability of its slipping, which is a serious defect, and interferes greatly with the progress of the work.

My invention has for its object to entirely remedy this defect and produce a self tightening and centering chuck in which the drill or other tool is held in such a manner as to effectually prevent any possibility of its slipping within the jaws; and my invention consists in a chuck provided with a series of jaws having inclined or curved serrated holding-surfaces, which are each advanced and withdrawn to grasp and release the drill in a line the direct prolongation of which will pass to one side of the center of the drill parallel with its diameter, so that the resistance will tend to rock the jaws on their longitudinal axes and cause them to act on the principle of a toggle and exert a leverage or bearing pressure on the rounded surface of the drill-spindle in such a manner that the gripe or holding power of the jaws thereon will increase in proportion to the resistance offered in turning the drill within the work.

My invention also relates to the method of holding the jaws within the chuck, and the construction of the mechanism by which the jaws are advanced and withdrawn to grasp and release the drill, whereby strength and durability are insured, and the necessity of pivoting the jaws or providing them with hooks at their rear ends to enable them to be operated is avoided; and my invention also consists in certain details of construction, as hereinafter set forth and specifically claimed.

In the said drawings, A represents the spindle of the chuck, which is adapted to be secured within the live-spindle of a lathe. The front end of the spindle A is made tapering, and is forced tightly into a correspondingly-shaped thimble, B, which is provided on its exterior surface with a left-hand thread, and is screwed into a hollow holder or mandrel, C, provided at its outer end with three longitudinal slots, $b$, placed at equal distances apart, in which are fitted the jaws D, by which the drill or other tool is grasped and held within the chuck.

The mandrel or holder C fits within a shell or casing, E, having its front end of tapering form, as seen in Figs. 2 and 6, and is made to slide longitudinally within the shell E by turning it around on the screw-thimble B, which is provided with a flange, $c$, at its rear end, fitting into an annular groove at the rear end of the shell E, the latter being rotated to cause the holder C to slide forward or back within it, by means of the outer sleeve, G, which surrounds and incloses the shell E. This sleeve G is made in two portions, $d\ e$, screwed together at $f$, the front portion, $d$, having a slot, $g$, in which fits a pin or projection, $h$, on the shell E, so that as the outer sleeve is turned by the hand its rotation will be communicated to the shell E, and thence to the holder C, which is prevented from turning independently of the shell by the jaws D.

The exterior of the sleeve G is provided, as usual, with milled or roughened ribs, which afford a firm grasp for the hand.

The jaws D are each provided, at the rear end, with a thin projecting portion or tail piece, $i$, the edges 12 of which are inclined inward and rest upon the correspondingly-inclined edges of an inclined groove, $k$, formed in the shell E, while the jaws are also provided with lips or projections $m$ on opposite sides, which fit into corresponding recesses or grooves $n$ at the inner ends of the slots $b$, in which the jaws fit, which thus prevent the jaws from being moved in the direction of their length independently of the holder C, and consequently as the latter is moved longitudinally within the casing E, as described, the portions $i$ of the jaws are forced to slide down or up the inclined grooves or ways $k$, which causes them to move in a plane at right angles to the axis of the chuck, toward or from the drill $p$ or other tool, to grasp or release it, as desired. By thus providing the jaws with lips $m$, fitting into the grooves $n$, they are rendered much stronger, simpler, and more durable than where they are made with a hook at the rear end or pivoted on pins, as is common in many varieties of chucks as heretofore constructed; and it will be seen that the end 13 of the jaw takes a solid bearing against the inner end of the slot $b$, which thus effectually resists the forward thrust of the drill. Furthermore, the ends of the jaws D do not in any position extend beyond the end of the holder C, which is a great advantage, as the jaws are thus better supported and their outer ends form no projections to catch and interfere with the work being done.

The holding or griping surfaces of the jaws D are transversely inclined at an angle, and are each provided with a series of longitudinal V-shaped grooves, 14, forming teeth or serrations, which are adapted to take a firm hold upon the surface of the drill-spindle or tool with which they are brought into contact, these holding-edges being kept at all times parallel with each other and with the longitudinal axis of the chuck, so as to take a firm bearing against the drill along the entire length of the jaw. The slots $b$ at the front end of the holder C, in which the jaws D are fitted, are not cut radially with respect to the center or longitudinal axis of the chuck, but on a line which, if prolonged, would pass to one side of the center, by which construction, as the jaws D are advanced by their operating mechanism to grasp the drill, they are caused to move not in a radial line pointing to the center of the drill, but in a line the direct prolongation of which will pass to one side of the center of the drill parallel with its diameter and cut the circumference at two points, as shown by the dotted line in Fig. 7, the direction of the forward movement of the jaws being against or contrary to that of the resistance, the direction of which is shown by the arrow 15, the arrow 16 illustrating the direction of the rotation of the chuck, and thus, when the teeth of the jaws are forced firmly against the periphery of the drill-spindle $p$, the resistance to the power exerted in rotating the drill will tend to rock each jaw on its longitudinal axis in the direction of the arrow 17, and thus cause it to act on the principle of a toggle, as illustrated by the dotted lines $q\,r\,r\,s$, Fig. 7, this tendency of the jaws to rock causing them to exert a powerful leverage or varying pressure upon the rounded surface of the drill-spindle $p$, which thus increases the gripe or holding power of the jaws upon the drill in proportion to the resistance offered in turning it within the work, whereby all possibility of the slipping of the tool within the jaws is avoided and the chuck rendered absolutely self-tightening— a desideratum heretofore unattained in any chuck with which I am acquainted. Moreover, with a chuck having its jaws constructed and arranged to operate as described, there is not the slightest possibility of the drill or tool being thrown out of its proper central position when grasped by the jaws, which is an absolutely essential requirement.

It will be seen that the shape of the face of each jaw D is such that all of its teeth do not come into contact at the same time with the surface of the drill, different teeth engaging with different drills, according to their diameter. Thus the outermost teeth of the jaw act upon the largest-sized drills which the chuck will accommodate, as seen in Fig. 7, while the teeth nearest the center act upon drills of the smallest diameter, as seen in Fig. 8, which construction insures the drill, without regard to its size, being grasped or acted upon by the jaws at the proper points in its circumference to cause the resistance to produce the leverage above described.

It is evident that the holding-faces of the jaws may be slightly curved in cross-section, instead of being straight, if desired; but I prefer the form shown.

I do not wish to confine myself to the number of jaws used or to the mechanism described for moving the jaws toward or from the drill to grasp or release it, as it is obvious that any other suitable mechanism may be employed for actuating the jaws when the latter are constructed and arranged to exert a leverage or varying pressure upon the drill in proportion to the resistance, as above described.

What I claim as my invention, and desire to secure by Letters Patent, is—

1. In a drill-chuck, the jaws D, having their holding-surfaces inclined at an angle, and provided with teeth adapted to engage the surface of drills of varying diameters, and each arranged to move toward or from the drill in a line the prolongation of which will pass to one side of but contiguous to the center of the drill and parallel with its diameter, substantially in the manner and for the purpose set forth.

2. In a drill-chuck, the jaws D, each of which has one of its sides arranged upon a radial line drawn from the center of the chuck and forming an acute angle with the griping-faces of said jaws, substantially as set forth.

3. In a drill-chuck, the jaws D, each having one of its sides arranged along a radial line drawn from the center of the chuck, substantially as set forth.

4. In a drill-chuck, the combination, with the slotted holder C and the shell or casing E, having inclined grooves or ways $k$, of the jaws D, provided with tail-pieces $i$, adapted to slide in the grooves $k$, substantially as and for the purpose set forth.

5. In a drill-chuck, the combination of the slotted holder C, with its jaws D, the screw-thimble B, the shell or casing E, with its inclined grooves $k$, adapted to be rotated with the holder, and the outer sleeve, G, connected with the shell E by a pin, $h$, and slot $g$, or equivalent device, all constructed to operate together substantially in the manner and for the purpose described.

Witness my hand this 9th day of March, A. D. 1881.

CHARLES GAGE.

In presence of—
P. E. TESCHEMACHER,
W. J. CAMBRIDGE.